US012614493B2

(12) United States Patent
Zhang et al.

(10) Patent No.: US 12,614,493 B2
(45) Date of Patent: Apr. 28, 2026

(54) DISPLAY DEVICE, DISPLAY PANEL, METHOD AND DEVICE FOR GAMMA CORRECTION THEREOF

(71) Applicant: Hubei Yangtze Industrial Innovation Center Of Advanced Display Co., Ltd., Wuhan (CN)

(72) Inventors: Chengfeng Zhang, Shanghai (CN); Yuanjian Cui, Shanghai (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 18/462,437

(22) Filed: Sep. 7, 2023

(65) Prior Publication Data

US 2023/0410716 A1 Dec. 21, 2023

(30) Foreign Application Priority Data

Apr. 26, 2023 (CN) ......................... 202310496596.8

(51) Int. Cl.
*G09G 3/20* (2006.01)
*G09G 3/32* (2016.01)

(52) U.S. Cl.
CPC ............. *G09G 3/2074* (2013.01); *G09G 3/32* (2013.01); *G09G 2320/0233* (2013.01);
(Continued)

(58) Field of Classification Search
CPC ........ G09G 3/2074; G09G 3/32; G09G 3/006; G09G 3/2022; G09G 2320/0233;
(Continued)

(56) References Cited

U.S. PATENT DOCUMENTS

| | | | | |
|---|---|---|---|---|
| 2007/0035488 A1* | 2/2007 | Kimura | ................ | G09G 3/2029 345/77 |
| 2010/0039356 A1* | 2/2010 | Kimura | ................ | G09G 3/2037 345/77 |

(Continued)

FOREIGN PATENT DOCUMENTS

| | | |
|---|---|---|
| CN | 1783194 A | 6/2006 |
| CN | 113192455 A | 7/2021 |

OTHER PUBLICATIONS

China National Intellectual Property Administration (CNIPA), "First Office Action (English Translation)," Application No. 202310496596.8, issued to Hubei New Display Industry Innovation Center Co., Ltd. for invention titled 'Display Apparatus, Display Panel, and Gamma Debugging Method,' Notification Date: Jun. 11, 2025.

*Primary Examiner* — Christopher E Leiby
(74) *Attorney, Agent, or Firm* — KILPATRICK TOWNSEND & STOCKTON LLP

(57) ABSTRACT

A display panel, a method for gamma correction of a display panel and a device for gamma correction of a display panel are provided according to the present disclosure. The method for gamma correction includes: determining a target grayscale interval where the to-be-displayed grayscale is located and a target sub-frame corresponding to the target grayscale interval based on a to-be-displayed grayscale; correcting a gamma of the target grayscale interval including: in each of sub-frames other than the target sub-frame, providing a grayscale interval data signal to the sub-pixel, and in the target sub-frame, providing a data signal to the sub-pixel, and correcting based on collected optical data to obtain a calibration data signal. Further, a refresh period is divided into at least two sub-frames for gamma correction, and different sub-frames correspond to different grayscale intervals.

19 Claims, 14 Drawing Sheets

(52) U.S. Cl.
CPC ............... *G09G 2320/0673* (2013.01); *G09G 2320/0693* (2013.01); *G09G 2340/0435* (2013.01)

(58) Field of Classification Search
CPC ... G09G 2320/0673; G09G 2320/0693; G09G 2320/0238; G09G 2320/0271; G09G 2320/0276; G09G 2340/0435; G09G 2360/144
See application file for complete search history.

(56) References Cited

U.S. PATENT DOCUMENTS

| | | | | |
|---|---|---|---|---|
| 2010/0277516 | A1* | 11/2010 | Kimura ................ | G09G 3/2029<br>345/690 |
| 2012/0274614 | A1* | 11/2012 | Kimura ................ | G09G 3/3258<br>345/204 |
| 2015/0070406 | A1* | 3/2015 | Baek .................... | G09G 3/3406<br>345/88 |

* cited by examiner

DISPLAY DEVICE, DISPLAY PANEL, METHOD AND DEVICE FOR GAMMA CORRECTION THEREOF

This application claims priority to Chinese Patent Application No. 202310496596.8, titled "DISPLAY DEVICE, DISPLAY PANEL, METHOD AND DEVICE FOR GAMMA CORRECTION THEREOF", filed on Apr. 26, 2023 with the China National Intellectual Property Administration, which is hereby incorporated by reference in its entirety.

FIELD

The present disclosure relates to the field of image display technology, and more particularly, to a display panel, a method for gamma correction of a display panel and a device for gamma correction of a display panel.

BACKGROUND

In a display device, a display panel is required to correct the brightness of each level of grayscale according to a predetermined Gamma curve before outgoing, to ensure the brightness of each level of the display panel conforms to the Gamma curve. In this way, when displaying an image, the display panel can ensure that the details of different brightness in the image can be accurately displayed.

In conventional technology, when the display panel is subjected to a gamma correction, the display brightness of the display panel remains unchanged within a display period of one frame. In addition, a single Gamma curve is used for correction, which makes the correction method fixed and single.

SUMMARY

In view of this, a display panel, a method for gamma correction of a display panel and a device for gamma correction of a display panel are provided according to the present disclosure. The solutions are as follows.

In one embodiment, a method for gamma correction of a display panel is provided according to the present disclosure. The display panel includes a sub-pixel, where a refresh period of the sub-pixel is divided into at least two sub-frames, different sub-frames correspond to different grayscale intervals, and different grayscale intervals do not overlap with each other. The method for gamma correction includes:

- based on a to-be-displayed grayscale, determining a target grayscale interval where the to-be-displayed grayscale is located and a target sub-frame corresponding to the target grayscale interval; and
- correcting a gamma of the target grayscale interval including: in each of sub-frames other than the target sub-frame, providing a grayscale interval data signal to the sub-pixel; in the target sub-frame, providing a data signal to the sub-pixel, and correcting based on collected optical data to obtain a calibration data signal.

In one embodiment, a device for gamma correction of a display panel is further provided according to the present disclosure. In the above method for gamma correction, the display panel includes a sub-pixel, and a refresh period of the sub-pixel is divided into at least two sub-frames, and different sub-frames correspond to different grayscale intervals, the different grayscale intervals do not overlap with each other. The device for gamma correction includes:

- a controller, configured to determine a target grayscale interval where a to-be-displayed grayscale is located and a target sub-frame corresponding to the target grayscale interval based on the to-be-displayed grayscale; further configured to correct a gamma of the target grayscale interval including: in each of sub-frames other than the target sub-frame, provide a grayscale interval data signal to the sub-pixel; in the target sub-frame, provide a data signal to the sub-pixel, and correct based on collected optical data to obtain a calibration data signal.

In one embodiment, a display panel is further provided according to the present disclosure, the display panel includes:

- a sub-pixel, and a refresh period of the sub-pixel is divided into at least two sub-frames, different sub-frames correspond to different grayscale intervals, and the different grayscale intervals do not overlap with each other; and
- a controller, configured to determine a target grayscale interval where a to-be-displayed grayscale is located and a target sub-frame corresponding to the target grayscale interval based on the to-be-displayed grayscale; further configured to correct a gamma of the target grayscale interval including: in each of sub-frames other than the target sub-frame, provide a grayscale interval data signal to the sub-pixel; in the target sub-frame, provide a data signal to the sub-pixel, and correct based on collected optical data to obtain a calibration data signal.

In one embodiment, a display device is further provided according to the present disclosure, which includes the above display panel.

BRIEF DESCRIPTION OF THE DRAWINGS

In order to more clearly illustrate the embodiments of the present disclosure, the drawings used in the description of the embodiments are briefly introduced hereinafter. It is apparent that the drawings in the following description illustrate only embodiments of the present disclosure.

The structures, proportions, sizes and the like shown in the drawings of this specification are only used to cooperate with the content disclosed in the specification, for those who are familiar with this technology to understand and read, which are not used to limit the conditions that can be implemented in the present disclosure, without any substantive significance. Any modification of the structure, change of the proportional relationship or adjustment of the size shall still fall within the scope covered by the technology content disclosed in the present disclosure without affecting the effect and purpose of the present disclosure.

DETAILED DESCRIPTION OF EMBODIMENTS

Hereinafter, embodiments of the present disclosure are described clearly and thoroughly with reference to the accompanying drawings in the embodiments of the present disclosure. It is apparent that the described embodiments are merely a part of the embodiments of the present disclosure rather than all of them.

In order to clarify the embodiments of the present disclosure more, hereinafter, the details of the present disclosure are further described in conjunction with the accompanying drawings and embodiments.

Figure 1:
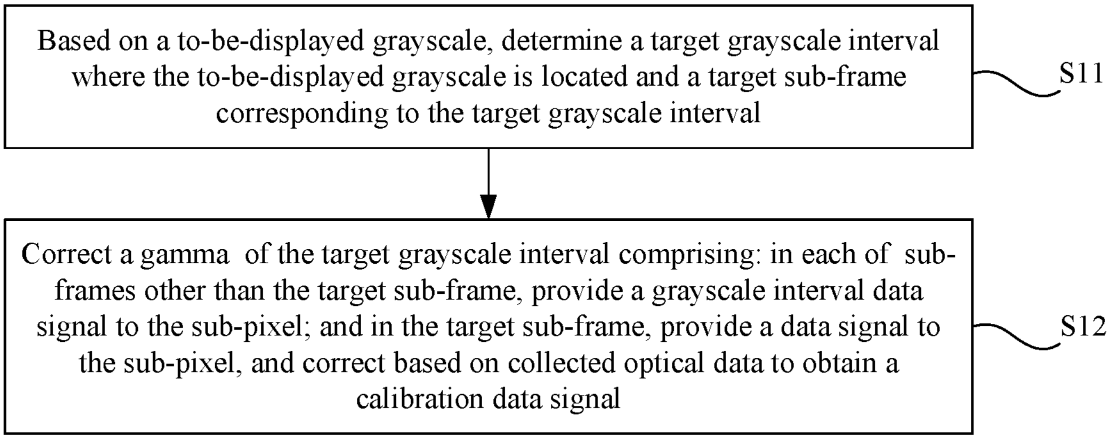
FIG. 1 is a schematic flowchart of a method for gamma correction of a display panel according to an embodiment of the present disclosure.

Referring to FIG. 1, FIG. 1 is a schematic flowchart of a method for gamma correction of a display panel according to an embodiment of the present disclosure. The display panel includes a sub-pixel, and a refresh period of the sub-pixel is divided into at least two sub-frames, and different sub-frames correspond to different grayscale intervals. Different grayscale intervals do not overlap with each other. The method for gamma correction includes steps S11 to S12 as follows.

In step S11, based on a to-be-displayed grayscale, a target grayscale interval where the to-be-displayed grayscale is located and a target sub-frame corresponding to the target grayscale interval are determined.

After the dividing mode of the sub-frames of the refresh period and the corresponding grayscale intervals is determined, once the to-be-displayed grayscale is acquired, the grayscale interval where the to-be-displayed grayscale is located is a target grayscale, and the corresponding sub-frame is a target sub-frame.

In step S12, gamma of the target grayscale interval is corrected, which includes: in sub-frames other than the target sub-frame, a grayscale interval data signal is provided to the sub-pixel; and in the target sub-frame, a data signal is provided to the sub-pixel, and then based on collected optical data, the correction is performed, to obtain a calibration data signal.

Figure 2:
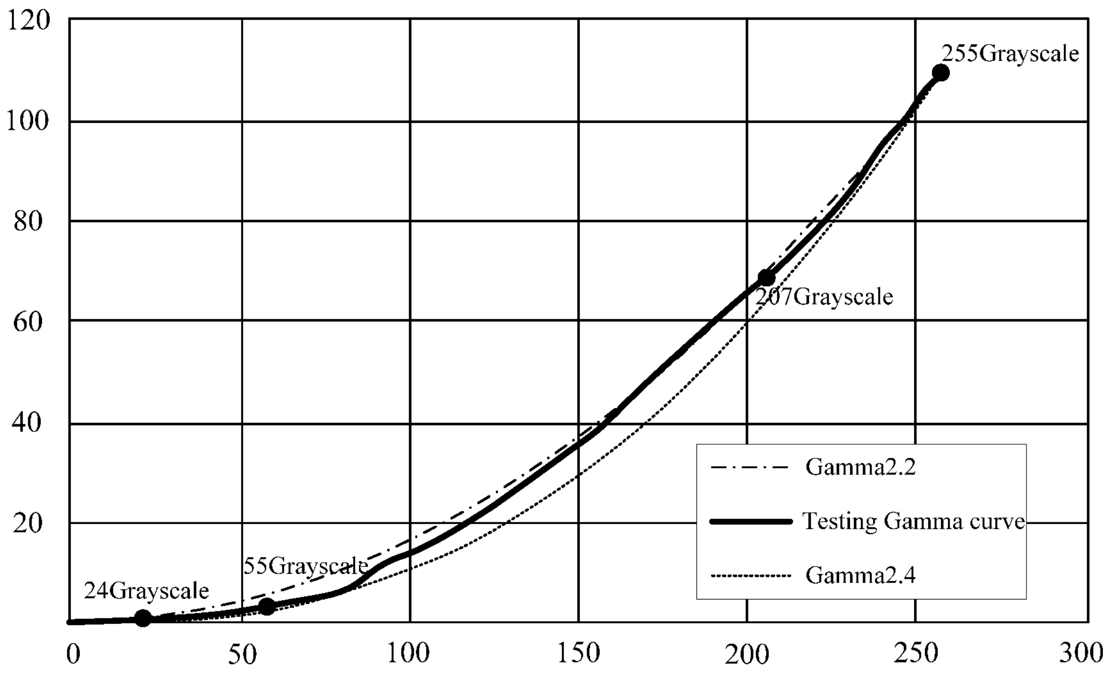
FIG. 2 is a graph of gamma curves according to an embodiment of the present disclosure.

Referring to FIG. 2, FIG. 2 is a graph of gamma curves according to an embodiment of the present disclosure. In FIG. 2, the horizontal axis is the grayscale, the vertical axis is the brightness; a curve in the densely dotted line is a curve of gamma 2.4, a curve in the densely dash-dotted line is a curve of gamma 2.2, and a curve in the black-thick-solid line is a testing gamma curve based on the method for gamma correction in the present disclosure. As shown in FIG. 2, it shows the coordinates when the grayscales in the testing gamma curve are 24, 55, 207 and 255 respectively. As shown in FIG. 2, the testing gamma curve based on the method for gamma correction in the present disclosure is located between the curve of gamma 2.2 and the curve of gamma 2.4, which meets the gamma correction standard.

For sub-frames other than the target sub-frame, the grayscale interval data signal provided to the sub-pixel is a preset fixed data signal, and the sub-pixel displays based on the corresponding grayscale interval data signal. The fixed data signal includes at least one of a first data signal, a second data signal and a dark state data signal described below. The target sub-frame is corrected based on the to-be-displayed grayscale, to obtain the calibration data signal.

Where, when the sub-pixel is driven for display, different display grayscales correspond to different initial data signals. Theoretically, when the sub-pixel is driven to display based on the initial data signal, the sub-pixel can have the display brightness of the corresponding display grayscale. However, due to factors such as the manufacturing process of the panel, when the sub-pixel is driven for display based on the initial data signal, the display brightness of the sub-pixel deviates from the corresponding display grayscale. In one embodiment of the present disclosure, in the target sub-frame, the data signal provided to the sub-pixel is the initial data signal corresponding to the to-be-displayed grayscale, and the calibration data signal is obtained by correcting based on the optical data collected under the initial data signal.

It is assumed that the to-be-displayed grayscale is GSx, and the corresponding initial data signal is Vdata0. In a conventional gamma correction method, one refresh period is one sub-frame. In a light-emitting phase of the sub-pixel of the sub-frame, the sub-pixel is controlled to display based on the initial data signal Vdata0, and the optical data collected at this time is used for correcting to obtain the calibration data signal Vdata1. When the display panel is displaying an image, in a case that the to-be-displayed grayscale is GSx, in the light-emitting phase of the sub-pixel of the sub-frame, the sub-pixel is controlled to display based on the calibration data signal Vdata1.

In comparison, in the method for gamma correction of the embodiments of the present disclosure, in sub-frames other than the target sub-frame, the sub-pixel is driven for display based on the grayscale interval data signal in each sub-frame; and in the target sub-frame, the sub-pixel is controlled to display based on the initial data signal Vdata0 corresponding to the to-be-displayed grayscale GSx; and the calibration data signal Vdata1' is obtained by correcting based on the optical data collected at this time, which enable the gamma correction to be more flexible. When the display panel is displaying an image, in a case that the to-be-displayed grayscale is GSx, a refresh period is divided into multiple sub-frames. In sub-frames other than the target sub-frame, in each sub-frame, the sub-pixel is driven to display based on the grayscale interval data signal; and in the target sub-frame, the sub-pixel is controlled to display based on the calibration data signal Vdata1'. In this way, when the display device displays an image, in one target sub-frame from the multiple sub-frames, it displays based on the calibration data signal, and in other sub-frames, it displays based on the grayscale interval data signal, which elevates the flexibility of the gamma correction.

In the method for gamma correction provided in the embodiment of the present disclosure, a refresh period of a sub-pixel is divided into at least two sub-frames, and different sub-frames correspond to different grayscale intervals. When displaying an image, based on the determined target grayscale, different display controls are performed on the sub-pixel in the target sub-frame and sub-frames other than the target sub-frame respectively, which enable the gamma correction to be more flexible. Where, an integrated display brightness of the sub-frames is the same as the display brightness displayed based on the to-be-displayed grayscale in the entire refresh period.

Figure 3:
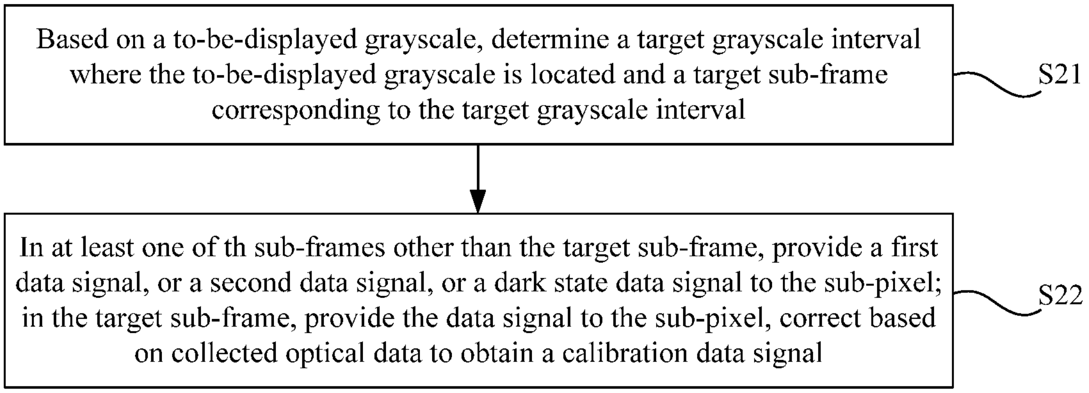
FIG. 3 is a schematic flowchart of a method for gamma correction of a display panel according to another embodiment of the present disclosure.

Referring to FIG. 3, FIG. 3 is a schematic flowchart of a method for gamma correction of a display panel according to another embodiment of the present disclosure. As shown in FIG. 3, the method for gamma correction includes step S21 and step S22 as follows.

In step S21, based on a to-be-displayed grayscale, a target grayscale interval where the to-be-displayed grayscale is located and a target sub-frame corresponding to the target grayscale interval are determined. This step is the same as the above step S11.

In step S22, in at least one sub-frame other than the target sub-frame, the first data signal, or the second data signal, or the dark state data signal is provided to the sub-pixel; and in the target sub-frame, a data signal is provided to the sub-pixel, based on collected optical data, correction is performed to obtaining a calibration data signal.

Where, the first data signal is a data signal corresponding to a larger endpoint-grayscale (e.g., the right endpoint-grayscale) between two endpoint-grayscales of a corresponding grayscale interval, and the second data signal is a data signal corresponding to a preset grayscale between the two endpoint-grayscales of the corresponding grayscale interval. The preset grayscale may be any grayscale value between the two endpoint-grayscales of the corresponding grayscale interval.

In a case that the first data signal, or the second data signal, or the dark state data signal is provided to the sub-pixel in at least one sub-frame other than the target sub-frame, in a refresh period, at least one sub-frame in the sub-frames other than the target sub-frame may be set as in a dark state, and the integrated display brightness of all sub-frames that are in the non-dark state can be greater than the integrated display brightness of all sub-frames. Setting the sub-frame in the dark state can reduce the lighting time of the sub-pixel in a refresh period. Although the integrated display brightness of all sub-frames in the non-dark state is greater than the integrated display brightness of all sub-frames, in the low grayscale display, the operating voltage/current of the non-dark state sub-frame is within a safe operating range, and on this basis, reducing the lighting time of the sub-pixel in one refresh period can improve a service life of the display panel.

In the above step S12, in sub-frames other than the target sub-frame, the grayscale interval data signal is provided to the sub-pixel, which includes: the first data signal, or the second data signal, or the dark state data signal is provided to the sub-pixel in at least one sub-frame other than the target sub-frame as described in the above step S22.

When the sub-pixel is inputted with a dark state data signal, the sub-pixel is in a non-display state where it is not lit. A dark state data signal is a data signal that enables the sub-pixel to be in a determined non-display state. After the grayscale interval corresponding to each sub-frame is determined, the two endpoint-grayscales of the grayscale interval are determined constants. The preset grayscale is a predetermined constant based on the two endpoint-grayscales. Hence, both the first data signal corresponding to the right endpoint-grayscale and the second data signal corresponding to the preset grayscale are determined data signals. Where, the data signal is positively correlated with the corresponding to-be-displayed grayscale, thus the second data signal corresponding to the preset grayscale between the two endpoint-grayscales is less than the first data signal corresponding to the right endpoint-grayscale.

Based on the above description, after the grayscale interval corresponding to each sub-frame is determined, the first data signal, the second data signal and the dark state data signal are all determined data signals. In sub-frames other than the target sub-frame, the sub-pixel is controlled to emit light based on one of the first data signal, the second data signal and the dark state data signal, to facilitate the light-emitting display control of sub-frames other than the target sub-frame. Apparently, in the embodiment of the present disclosure, in all sub-frames other than the target sub-frame, the sub-pixel may be set to be controlled to display based on the first data signal. In one embodiment, in all sub-frames other than the target sub-frame, the sub-pixel may be set to be controlled to display based on the second data. In one embodiment, in a part of those sub-frames, the sub-pixel is controlled to display based on the first data signal, and in another part of those sub-frames, the sub-pixel is controlled to display based on the second data.

In the embodiment of the present disclosure, the method of dividing one refresh period of a sub-pixel into at least two sub-frames includes: grayscales ranged from 0 to 255 is divided into a first grayscale interval to a n-th grayscale interval; where, a grayscale range of a i-th grayscale interval is from $GS_{i-1}$ to $GS_i$, where n is a positive integer and i is a positive integer and no greater than n, $GS_i$ is a positive number in the grayscales ranged from 0 to 255, $GS_{i-1}$ is less than $GS_i$, $GS_0=0$, $GS_n=255$; where, a refresh period includes a first sub-frame to a n-th sub-frame, a timing of the (i−1)-th sub-frame is before a timing of a i-th sub-frame, and the i-th sub-frame corresponds to the i-th grayscale interval. In this way, the division method of the sub-frames of the refresh period and the corresponding grayscale intervals is simple, which is convenient for subsequent light-emitting display control.

In order to enable each grayscale value in the grayscales ranged from 0 to 255 to be located in a corresponding grayscale interval, and based on the first data signal is the data signal of the right endpoint-grayscale of the corresponding grayscale interval, the first grayscale interval is set as a closed interval, while other grayscale intervals are all left-open and right-closed intervals. The interval division manner is not limited to the left-open and right-closed interval manner above, and each grayscale interval may also be set as a right-closed and left-open interval, and each grayscale value in the grayscales ranged from 0 to 255 is located in a corresponding grayscale interval.

According to the dividing method of sub-frames and corresponding grayscale intervals in the above refresh period, when the to-be-displayed grayscale is in the j-th grayscale interval, j is a positive integer and no greater than n. In one manner, the implementation of the step S12 includes step S32, step S33 and step S34 as shown in FIG. 4.

Figure 4:
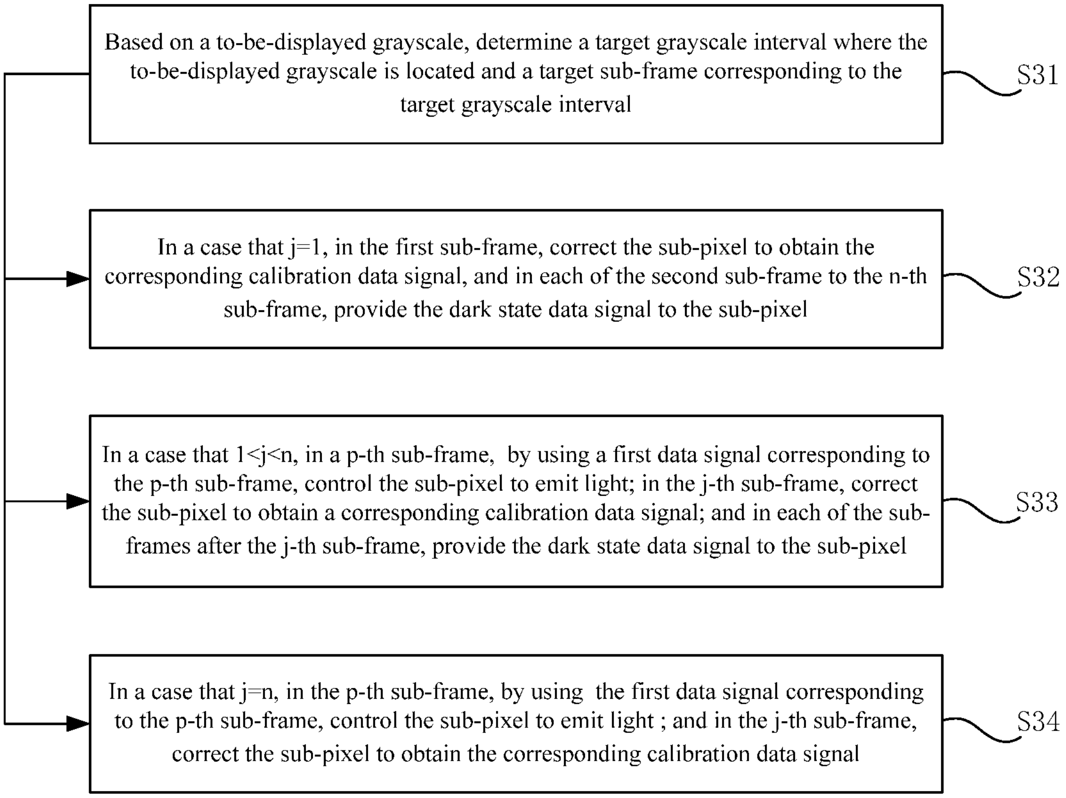
FIG. 4 is a schematic flowchart of a method for gamma correction of a display panel according to still another embodiment of the present disclosure.

Referring to FIG. 4, FIG. 4 is a schematic flowchart of a method for gamma correction of a display panel according to still another embodiment of the present disclosure. The method for gamma correction as shown in FIG. 4 includes step S31 to S34.

In step S31, based on the to-be-displayed grayscale, a target grayscale interval where the to-be-displayed grayscale is located and a target sub-frame corresponding to the target grayscale interval are determined. This step is the same as the above step S11.

As described above, it is assumed that there are n sub-frames, from the first sub-frame to the n-th sub-frame sequentially, and the target sub-frame is the j-th sub-frame. Based on the value of j, the following step S32, step S33, or step S34 is selected to implement.

In step S32, in a case that j=1, in the first sub-frame, the sub-pixel is corrected to obtain a corresponding calibration data signal; and in each of the second sub-frame to the n-th sub-frame, a dark state data signal is provided to the sub-pixel.

In step S33, in a case that 1<j<n, in a p-th sub-frame, the sub-pixel is controlled to emit light, by using a first data signal corresponding to the p-th sub-frame; in the j-th sub-frame, the sub-pixel is corrected to obtain the corresponding calibration data signal; and in each of sub-frames after the j-th sub-frame, the dark state data signal is provided to the sub-pixel.

In step S34, in a case that j=n, in the p-th sub-frame, the sub-pixel is controlled to emit light, by using the first data signal corresponding to the p-th sub-frame; and in the j-th sub-frame, the sub-pixel is corrected to obtain the corresponding calibration data signal.

Where, p is a positive integer and less than j.

In the manner shown in FIG. 4, based on the timing of the target sub-frame, a dark state data signal or a corresponding first data signal is provided to the sub-pixel in sub-frames to control the sub-pixel to emit light. The dark state data signal and the first data signal corresponding to each sub-frame are determined data signals, which make the process for controlling the light emission of sub-pixel in other sub-frames simple.

Based on the method of dividing the refresh period into multiple sub-frames, in a case that n=4, the grayscales ranged from 0 to 255 are divided into the first grayscale interval to the fourth grayscale interval. The first sub-frame corresponds to the first grayscale interval, the first grayscale interval is $[GS_0, GS_1]$; the second sub-frame corresponds to the second grayscale interval, and the second grayscale interval is $(GS_1, GS_2]$. The third sub-frame corresponds to the third grayscale interval, and the third grayscale interval is $(GS_2, GS_3]$. The fourth sub-frame corresponds to the fourth grayscale interval, and the fourth grayscale interval is $(GS_3, GS_4]$. Where, $GS_0=0$, $GS_4=255$. The first grayscale interval is a closed interval, and the second to fourth grayscale intervals are left-open and right-closed intervals.

It should be noted that, in this embodiment of the present disclosure, with n=4, a refresh period is divided into four sub-frames, and the grayscales of 0-255 is correspondingly divided into four grayscale intervals, which illustrates the method for gamma correction provided by the embodiment of the present disclosure. It is apparent that the value of n may be set to any positive integer greater than 1 as required, which is not limited to the solution of n=4 provided in this embodiment of the present disclosure.

Based on the manner shown in FIG. 4, when n=4, it sets that $GS_1=a$, $GS_2=b$, $GS_3=c$, $GS_4=d$. Where, a, b, c, and d increase sequentially, and they are all positive integers and no greater than 255. In one refresh period, when the multiple sub-frames gamma correction is performed, the gamma curves are shown in FIG. 5.

Figure 5:
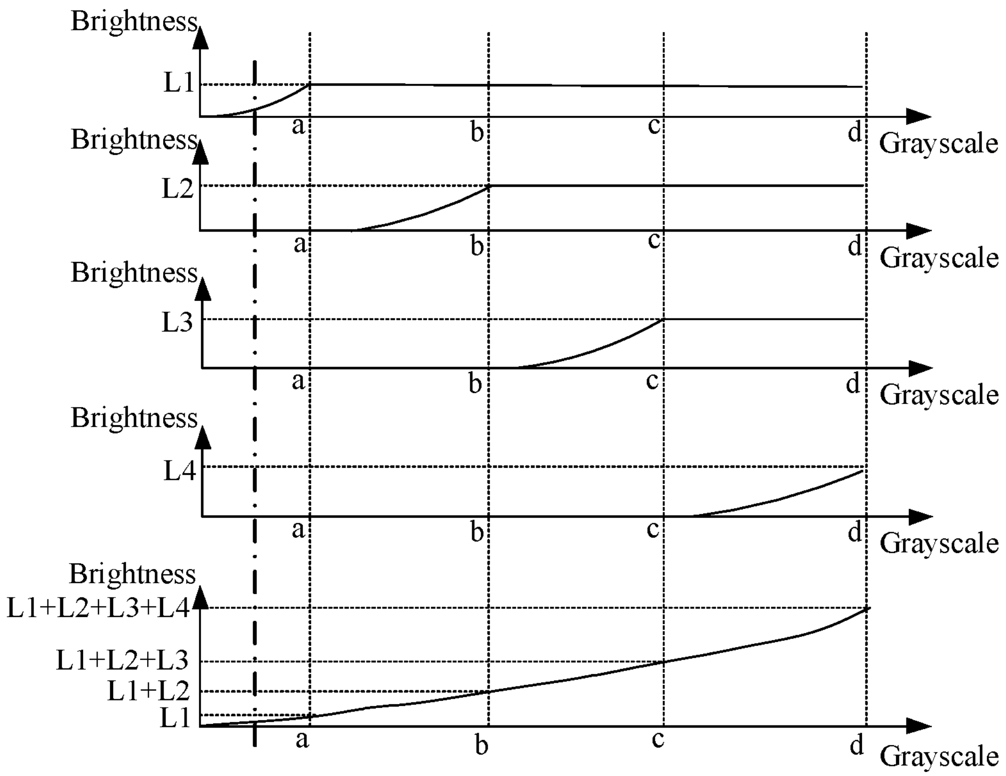
FIG. 5 is schematic diagrams of gamma curves of multiple sub-frames gamma correction according to an embodiment of the present disclosure.

Referring to FIG. 5, FIG. 5 is schematic diagrams of gamma curves of multiple sub-frame gamma correction according to an embodiment of the present disclosure. In Figure the curves from top to bottom are the gamma curve of the first sub-frame, the gamma curve of the second sub-frame, the gamma curve of the third sub-frame, the gamma curve of the fourth sub-frame, and the integrated gamma curve of the four sub-frames; the horizontal axis represents the grayscale, and the vertical axis represents the brightness; the display brightness of the first data signal corresponding to the first grayscale interval to the fourth grayscale interval is L1, L2, L3 and L4 in sequence. The simulation data shows that when n=4, the light-emitting display control of the display panel is performed based on the integrated gamma curve obtained by the embodiments of the present disclosure, which conforms to the display standard of the color management standard gamma 2.2.

In a first correction state: in a case that the to-be-displayed grayscale (e.g., the vertical dash-dotted line shown in FIG. 5 indicates the to-be-displayed grayscale) is located in the first sub-frame, then the first sub-frame is the target sub-frame, and the corresponding first grayscale interval is the target grayscale interval; In this case, j=1, according to the method for gamma correction shown in FIG. 4, step S32 is executed, in the extension direction of the dash-dotted line shown in FIG. 5, in the first sub-frame, the sub-pixel is corrected to obtain the corresponding calibration data signal, and the dark state data signal is provided to the sub-pixel in each of the second sub-frame to the fourth sub-frame, and the sub-pixel is in the dark state in the three sub-frames.

In a second correction state: in a case that the to-be-displayed grayscale is located in the second sub-frame, then the second sub-frame is the target sub-frame, and the corresponding second grayscale interval is the target grayscale interval; In this case, j=2, according to the method for gamma correction shown in FIG. 4, step S33 is executed. In the first sub-frame, the corresponding first data signal is provided to the sub-pixel, and the sub-pixel can display with a brightness L1; in the second sub-frame, the sub-pixel is corrected to obtain the corresponding calibration data signal; and in the third sub-frame and in the fourth sub-frame, the dark state data signals are provided to the sub-pixel, and the sub-pixel is in the dark state in the two sub-frames.

In a third correction state: in a case that the to-be-displayed grayscale is located in the third sub-frame, then the third sub-frame is the target sub-frame, and the corresponding third grayscale interval is the target grayscale interval. In this case, j=3, according to the method for gamma correction shown in FIG. 4, step S33 is executed. In the first sub-frame and the second sub-frame, the corresponding first data signals are respectively provided to the sub-pixel, and the sub-pixel can display with a brightness L1 and a brightness L2 respectively; in the third sub-frame, the sub-pixel is corrected to obtain the corresponding calibration data signal; and in the fourth sub-frame, the sub-pixel is provided with a dark state data signal, and the sub-pixel is in a dark state.

In a fourth correction state: in a case that the to-be-displayed grayscale is located in the fourth sub-frame, then the fourth sub-frame is the target sub-frame, and the corresponding fourth grayscale interval is the target grayscale interval. In this case, j=4, according to the method for gamma correction shown in FIG. 4, step S34 is executed. In the first sub-frame to the third sub-frame, the corresponding first data signals are provided to the sub-pixels respectively, and the sub-pixel can display with the brightness L1, the brightness L2 and brightness L3 respectively; and in the fourth sub-frame, the sub-pixel is corrected to obtain corresponding calibration data signal.

According to the dividing method of sub-frames and corresponding grayscale intervals in the refresh period above, when the to-be-displayed grayscale is in the j-th grayscale interval, j is a positive integer and no greater than n. In another manner, the implementation of the above step S12 includes step S42, step S43 and step S44 in FIG. 6.

Figure 6:
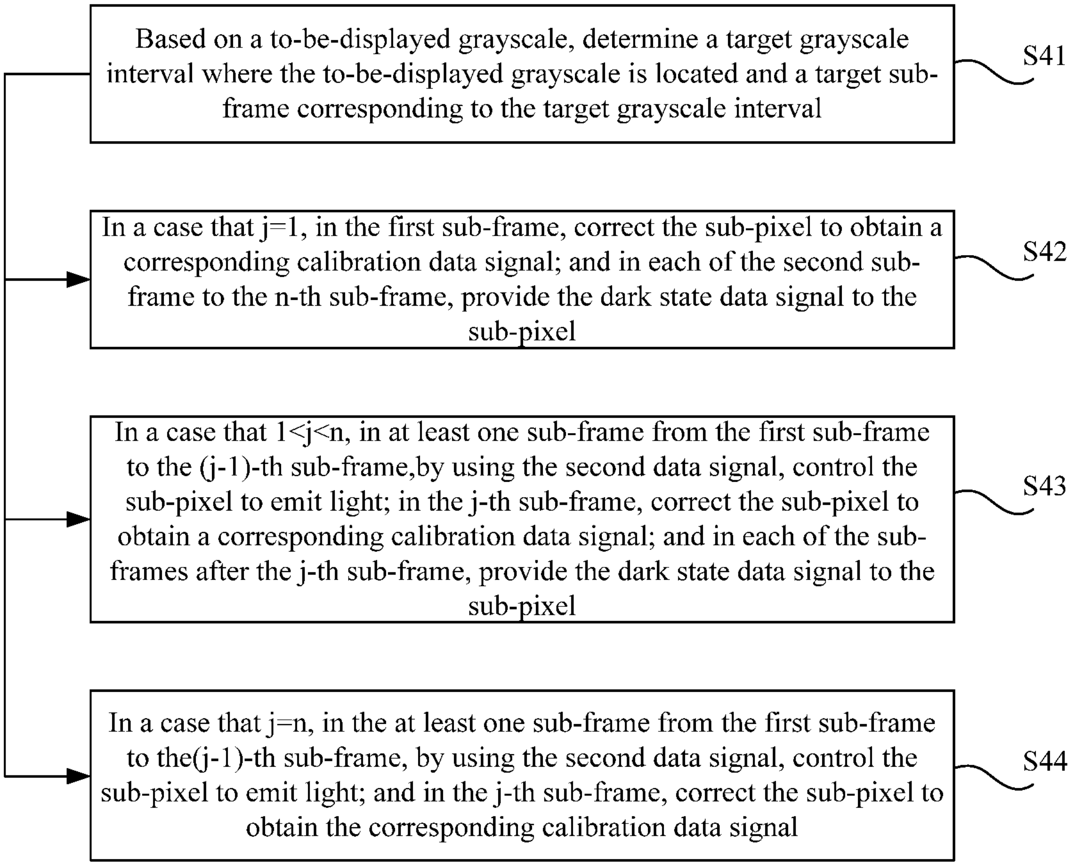
FIG. 6 is a schematic flowchart of a method for gamma correction of a display panel according to still another embodiment of the present disclosure.

Referring to FIG. 6, FIG. 6 is a schematic flowchart of a method for gamma correction of a display panel according to still another embodiment of the present disclosure. The method for gamma correction shown includes step S41 to step S44 as follows.

In step S41, based on the to-be-displayed grayscale, a target grayscale interval where the to-be-displayed grayscale is located and a target sub-frame corresponding to the target grayscale interval are determined. This step is the same as the above step S11.

In step S42, in a case that j=1, in the first sub-frame, the sub-pixel is corrected to obtain a corresponding calibration data signal; and in each of the second sub-frame to the n-th sub-frame, the dark state data signal is provided to the sub-pixel respectively.

In step S43, in a case that 1<j<n, in at least one sub-frame from the first sub-frame to the (j−1)-th sub-frame, the sub-pixel is controlled to emit light, by using the second data signal; and in the j-th sub-frame, the sub-pixel is corrected to obtain a corresponding calibration data signal; and in each of the sub-frames after the j-th sub-frame, the dark state data signal is provided to the sub-pixel respectively.

In step S44, in a case that j=n, in the at least one sub-frame from the first sub-frame to the (j−1)-th sub-frame, the sub-pixel is controlled to emit light, by using the second data signal; and in the j-th sub-frame, the sub-pixel is corrected to obtain the corresponding calibration data signal.

In the manner shown in FIG. 6, based on the determined timing of the target sub-frame, a dark state data signal or a corresponding second data signal is provided to the sub-pixel in each of sub-frames to control the sub-pixel to emit light. Both the dark state data signal and the second data signal corresponding to each sub-frame are determined data signals, and the method for controlling the light-emitting of the sub-pixel in other sub-frames is simple.

In an embodiment, the value of the preset grayscale corresponding to the second data signal ranges from 0.8M to M, where M is a positive integer and no greater than 255. M is the larger endpoint-grayscale between the two endpoint-grayscales of the grayscale interval corresponding to the second data signal. In other words, M is the right endpoint-grayscale of the grayscale interval corresponding to the preset grayscale. The value range of the preset grayscale is set in a range of 0.8M to M, and the preset grayscale is closer to the right endpoint-grayscale of the grayscale interval. In a case that the sub-pixel is displayed based on the corresponding second data signal, the sub-pixel can have large display brightness.

In the embodiment of the present disclosure, in at least one sub-frame other than the target sub-frame, the first data signal, or the second data signal, or the dark state data signal is provided to the sub-pixel, which includes as follows: in the sub-frames before the target sub-frame, in at least one sub-frame, the first data signal is provided to the sub-pixel. In this manner, in all sub-frames before the target sub-frame, the first data signal may be provided, or the first data signal may be provided in a part of sub-frames before the target sub-frame and the second data signal may be provided in another part of sub-frames before the target sub-frame. And, in the sub-frames after the target sub-frame, the dark state data signals are provided to the sub-pixel. In a case that a refresh period includes the first sub-frame to the n-th sub-frame, in this case, the j-th sub-frame is the target sub-frame, and 1<j<n. For the first sub-frame to the (j−1)-th sub-frame before the target sub-frame, in at least one sub-frame, the first data signal is provided to the sub-pixel, and the sub-pixel is controlled to emit light based on the first data signal, which can enable the corresponding grayscale interval to display with a maximum brightness. For the (j+1)-th sub-frame to the n-th sub-frame after the target sub-frame, the sub-pixel is controlled to emit light based on the dark state data signal, which can make the sub-pixel in a non-display dark state and reduce power consumption.

In an embodiment, in all sub-frames before the target sub-frame, the first data signals are set to be provided to the sub-pixel. In this way, in each of the sub-frames before the target sub-frame, the light-emitting control is performed based on the corresponding first data signal. And the sub-frames after the target sub-frame are all in the non-display dark state based on the dark state data signal, which is convenient for the timing control of the data signal during gamma correction. As described above, the first data signal may also be provided in a part of sub-frames before the target sub-frame, and the second data signal may be provided in another part of sub-frames before the target sub-frame.

In other manners, the sub-pixel may be provided with the first data signal, or the second data signal, or the dark state data signal in at least one sub-frame other than the target sub-frame, which includes as follows: in the sub-frame before the target sub-frame, the second data signal is provided to the sub-pixel in at least one sub-frame. In this way, the second data signal may be provided in all the sub-frames before the target sub-frame, or the second data signal may be provided in a part of the sub-frames before the target sub-frame and the first data signal may be provided in another part of the sub-frames before the target sub-frame; and in the sub-frame after the target sub-frame, the dark state data signal is provided to the sub-pixel.

Based on the method for gamma correction provided by the embodiment of the present disclosure, for a sub-frame before the target sub-frame, light-emitting display control can be performed with the first data signal or the second data signal as required, which increases the flexibility of gamma correction.

Figure 7:
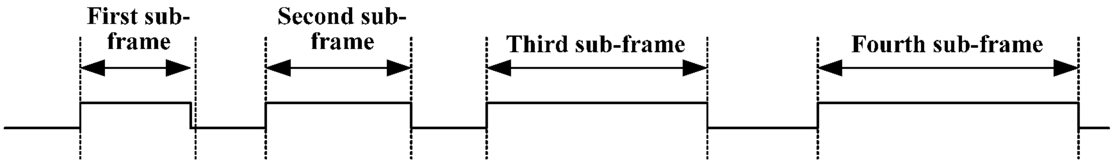
FIG. 7 is a schematic diagram of a setting mode of each sub-frame in a refresh period according to an embodiment of the present disclosure.

Referring to FIG. 7, FIG. 7 is a schematic diagram of a setting mode of each sub-frame in a refresh period according to an embodiment of the present disclosure. In the same refresh period, the duration of each sub-frame increases sequentially in timing. In FIG. 7, n=4 is taken as an example for illustration.

The duration of each sub-frame is set to increase sequentially in timing, and the duration of the sub-frame earlier in timing is shorter. Correspondingly, the duration of the sub-frame corresponding to the grayscale interval closer to 0 grayscale is shorter. Based on this, the gamma correction is performed to ensure the display quality of the display panel when displaying low grayscale. Where, the shorter the duration of the sub-frame is, the shorter the data writing phase and the light-emitting phase of the sub-frame are.

Since the duration of the sub-frame corresponding to the grayscale interval closer to grayscale is set to be shorter, the duration of the first sub-frame is the shortest. When the low grayscale display is performed, the to-be-displayed grayscale is located in the grayscale interval corresponding to the first sub-frame, and the first sub-frame is the target sub-frame which performs light-emitting display, while other sub-frames do not perform light-emitting display. In this case, the shorter the duration of the first sub-frame is, the shorter the duration of the light-emitting display is in a refresh period, and the longer the duration of the non-light-emitting display is. In order to make the integrated display brightness of a refresh period meet the display requirements, the driving circuit in the light-emitting stage of the first sub-frame is required to be larger, and the light-emitting brightness of the first sub-frame is higher, to meet the integrated display brightness requirement of one refresh period. Since a sub-frame includes a data writing phase and a light-emitting phase, in order to ensure that the data signal is completely written in the data writing phase, the duration of the first sub-frame cannot be too short.

Where, in the embodiments of the present disclosure, the display control of multiple sub-frames is performed in one refresh period, and the integrated display brightness of all sub-frames in the same refresh period is the same as the display brightness of a single sub-frame in one refresh period.

Based on the above, when the method for gamma correction is applied to a MicroLED display panel, it can solve the problem of poor light-emitting display effect of the MicroLED display panel at low grayscales.

Figure 8:
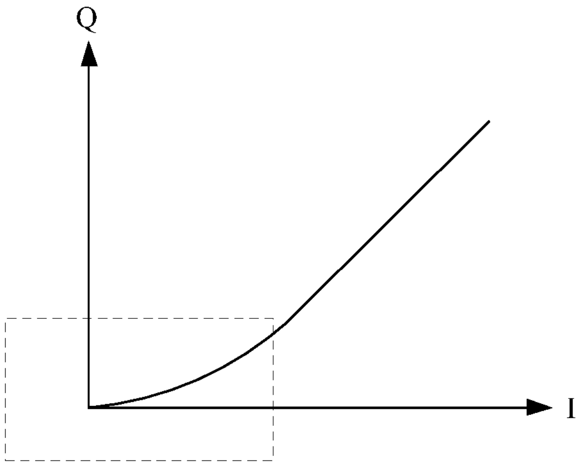
FIG. 8 is a curve of a current versus a brightness of a MicroLED before gamma correction.
Figure 9:
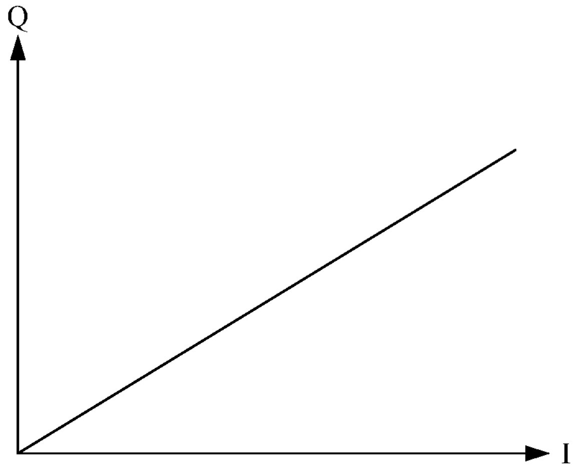
FIG. 9 is a curve of a current versus a brightness of the MicroLED after display data calibration based on the method for gamma correction according to an embodiment of the present disclosure.

Referring to FIG. 8 and FIG. 9, FIG. 8 is a curve of current versus brightness of a MicroLED before gamma correction, and FIG. 9 is a curve of current versus brightness of the MicroLED after display data calibration based on the method for gamma correction according to an embodiment of the present disclosure.

As shown in FIG. 8, when the gamma correction is not performed, the MicroLED performs low grayscale display (light-emitting display based on a relatively small current), as shown in the dotted box in FIG. 8, the relationship between the current and the light-emitting brightness is not linear.

As shown in FIG. 9, after the display data of the MicroLED is corrected based on the method for gamma correction provided by the embodiment of the present disclosure, when the MicroLED performs low grayscale display, the current has a linear relationship with the light-emitting brightness. This is due to the solution of the present disclosure that the display control of multiple sub-frames is carried out in one refresh period, the duration of the sub-frame corresponding to the grayscale interval closer to 0 grayscale is shorter, and the current in the light-emitting stage can be increased during low grayscale display, and after the gamma is corrected, the current and brightness of the MicroLED have a linear relationship, to improve the display quality of the MicroLED in low grayscale display.

In the embodiment of the present disclosure, the sub-pixel in the display panel may be a micro LED, and the micro LED may be a Micro LED or Mini LED, which is not limited to the implementation of the above Micro LED.

The duration of each sub-frame in a refresh period may be set as required. In other manners, a refresh period of sub-pixel can be equally divided into at least two sub-frames. The refresh period is equally divided into multiple sub-frames, and the duration of each sub-frame in the same refresh period is the same, to facilitate the division of the duration of sub-frames in a refresh period.

In the embodiment of the present disclosure, the grayscales ranged from 0 to 255 may be set to be equally divided into at least two grayscale intervals. The grayscales ranged from 0 to 255 are evenly divided into multiple grayscale intervals, and the interval lengths of each grayscale interval are the same, which facilitates the division of the grayscale intervals.

The dividing manner of the grayscale interval may be set as required. In other manners, the grayscale ranged from 0 to 255 may also be divided into multiple grayscale intervals in an uneven manner. In this case, the interval length of the grayscale interval (i.e., the difference between the right endpoint-grayscale and the left endpoint-grayscale) is not exactly the same.

As described above, the grayscales ranged from 0 to 255 are divided into the first grayscale interval to the n-th grayscale interval, and the grayscale range of the i-th grayscale interval is from $GS_{i-1}$ to $GS_i$, where n is a positive integer, i is a positive integer and no greater than n, $GS_i$ is a positive number in the grayscales ranged from 0 to 255, $GS_{i-1}$ is less than $GS_i$, $GS_0=0$, $GS_n=255$. The interval midpoint of the p-th grayscale interval is at a first difference from $GS_n/2$, the interval midpoint of the q-th grayscale interval is at a second difference from $GS_n/2$, $p\neq 1$, and both p and q are positive integers and no greater than n; the absolute value of the first difference is greater than the absolute value of the second difference, and the difference between the two endpoint-grayscales of the p-th grayscale interval is less than the difference between the two endpoint-grayscales of the q-th grayscale interval. In this way, in the grayscale interval between 0 and $GS_n/2$ grayscale, the closer to the 0 grayscale, the shorter the interval length of the grayscale interval is; and in the grayscale interval between $GS_n/2$ to $GS_n$ grayscale, the closer to $GS_n$, the shorter the interval length of the grayscale interval is.

In other words, the interval widths of the low grayscale interval and the high grayscale interval are shorter. The current is relatively small when displaying low grayscales, and the current is relatively large when displaying high grayscales. For a micro LED, it is more likely to occur display abnormalities when working in the relatively large or small current. In the embodiment of the present disclosure, with the interval widths in the low grayscale interval and the high grayscale interval are set to be smaller, it can realize a fine gamma correction in the low grayscale display and high grayscale display, and the display panel can operate in the low grayscale interval and the high grayscale interval with an excellent display effect.

In an embodiment, when n=4, the first grayscale interval may be set to [0, 24], the second grayscale interval may be set to (24, 55], the third grayscale interval may be set to (55, 207], the fourth grayscale interval may be set to (207, 255]. In other words, the values of a, b, c, and d above are 24, 55, 207, and 255 in sequence.

For a display panel with micro-LEDs, as described above, after gamma correction is performed on the display panel by using the embodiments of the present disclosure, not only does the current and brightness satisfy the linear relationship when the micro-LEDs display low grayscale, but also the micro-LEDs have relatively fine gamma correction accuracy in both the low grayscale interval and the high grayscale interval, which improves the display quality in the low grayscale interval and the high grayscale interval.

Figure 10:
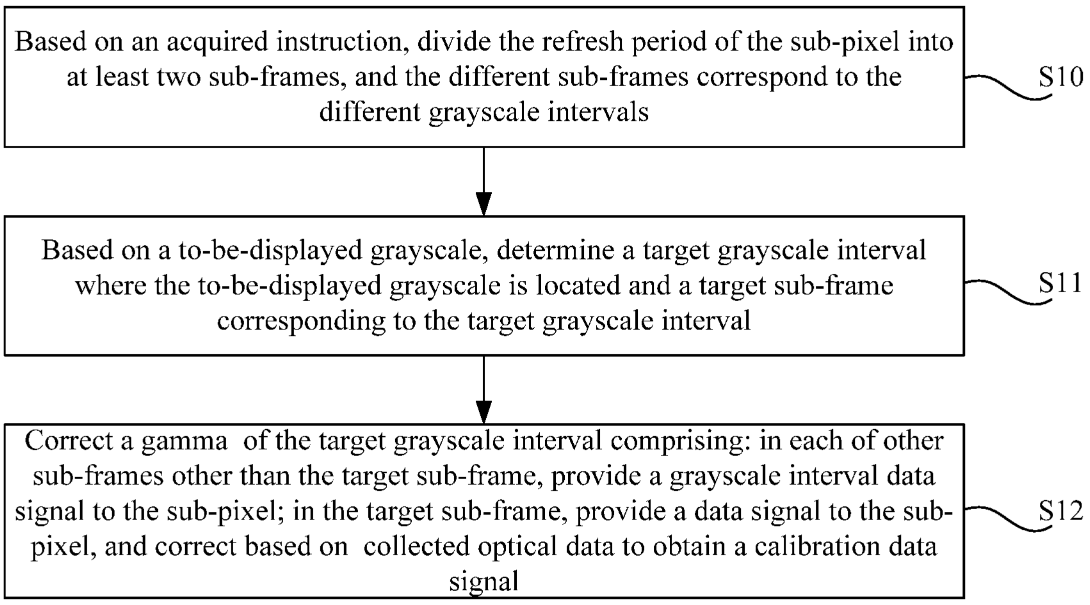
FIG. 10 is a schematic flowchart of a method for gamma correction of a display panel according to still another embodiment of the present disclosure.

Referring to FIG. 10, FIG. 10 is a schematic flowchart of a method for gamma correction of a display panel according to still another embodiment of the present disclosure. On the basis of the method shown in FIG. 1, before step S11, the method for gamma correction shown in FIG. 10 further includes:

In step S10, based on an acquired instruction, one refresh period of the sub-pixel is divided into at least two sub-frames, and different sub-frames correspond to different grayscale intervals.

In the manner shown in FIG. 10, when gamma correction is performed on the display panel, sub-frames and corresponding grayscale intervals in the refresh period can be set as required. In other manners, gamma correction can also be performed directly based on the setting manner of sub-frames and corresponding grayscale intervals in a fixed refresh period.

In the method for gamma correction provided by the present disclosure, one refresh period of the sub-pixel is divided into at least two sub-frames for gamma correction, and different sub-frames correspond to different grayscale intervals. In this way, the target sub-frame can be determined in multiple sub-frames based on the to-be-displayed grayscale. Different display controls are performed on the target sub-frame and sub-frames other than the target sub-frame, which make the method for gamma correction more flexible.

As described above, the method for gamma correction provided by the embodiments of the present disclosure can realize the multiple sub-frames gamma correction of the display panel, each sub-frame can have different display control methods, and the gamma correction of different sub-frames takes into account the gamma correction of other sub-frames, to make the integrated display brightness after the respective gamma correction of each sub-frames is the same as the display brightness of a single gamma correction using the to-be-displayed grayscale in one refresh period. In addition, each sub-frame can perform different display controls based on the corresponding grayscale interval, which can make gamma correction more flexible and diverse to improve display quality.

Based on the above embodiments, a device for gamma correction of a display panel is further provided according to another embodiment of the present disclosure, which can implement the method for gamma correction. As described above, the display panel includes a sub-pixel, where a refresh period of a sub-pixel is divided into at least two sub-frames, different sub-frames correspond to different grayscale intervals, and different grayscale intervals do not overlap with each other. The structure of a device for gamma correction may be shown in FIG. 11.

Figure 11:
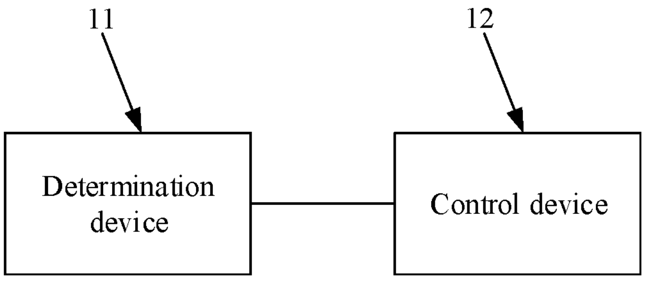
FIG. 11 is a schematic structural diagram of a device for gamma correction according to an embodiment of the present disclosure.

Referring to FIG. 11, FIG. 11 is a schematic structural diagram of a device for gamma correction according to an embodiment of the present disclosure. The device for gamma correction includes as follows.

A determination device 11, configured to determine a target grayscale interval where a to-be-displayed grayscale is located and the target sub-frame corresponding to the target grayscale interval based on the to-be-displayed grayscale.

A control device 12, configured to correct a gamma of the target grayscale interval, which includes: in each of sub-frames other than the target sub-frame, provide a grayscale interval data signal to the sub-pixel, and in the target sub-frame, provide a data signal to the sub-pixel, and correcting based on collected optical data to obtain a calibration data signal.

In an embodiment, the determination device 11 and the control device 12 may be implemented by means of a controller (not shown in the figure) as required, which is not limited in the present disclosure.

The device for gamma correction provided in the embodiment of the present disclosure can implement the above method for gamma correction, which can make gamma correction more flexible and diverse to improve display quality.

Figure 12:
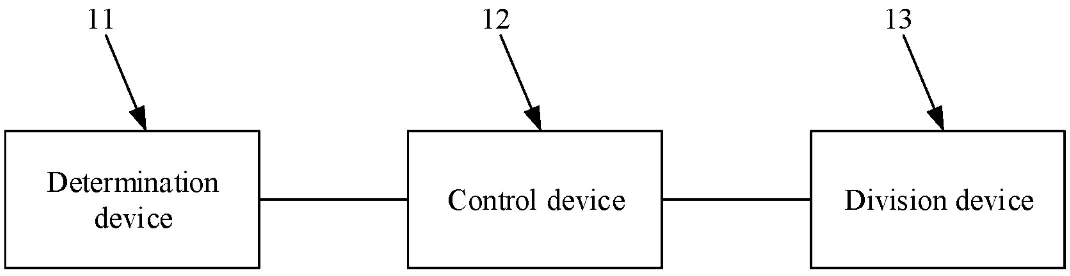
FIG. 12 is a schematic structural diagram of a device for gamma correction according to another embodiment of the present disclosure.

Referring to FIG. 12, FIG. 12 is a schematic structural diagram of a device for gamma correction according to another embodiment of the present disclosure. On the basis of the method shown in FIG. 11, the device for gamma correction shown in FIG. 12 further includes: a division device 13, a division device 13 is configured to divide a refresh period of the sub-pixel into at least two sub-frames based on an acquired instruction, and different sub-frames correspond to different grayscale intervals. In an embodiment, the division device 13 may be implemented by means of a controller (not shown in the figure) as required, which is not limited in the present disclosure.

With the device for gamma correction shown in FIG. 12, it may set the division of sub-frames and corresponding grayscale intervals in the refresh period as required.

Figure 13:
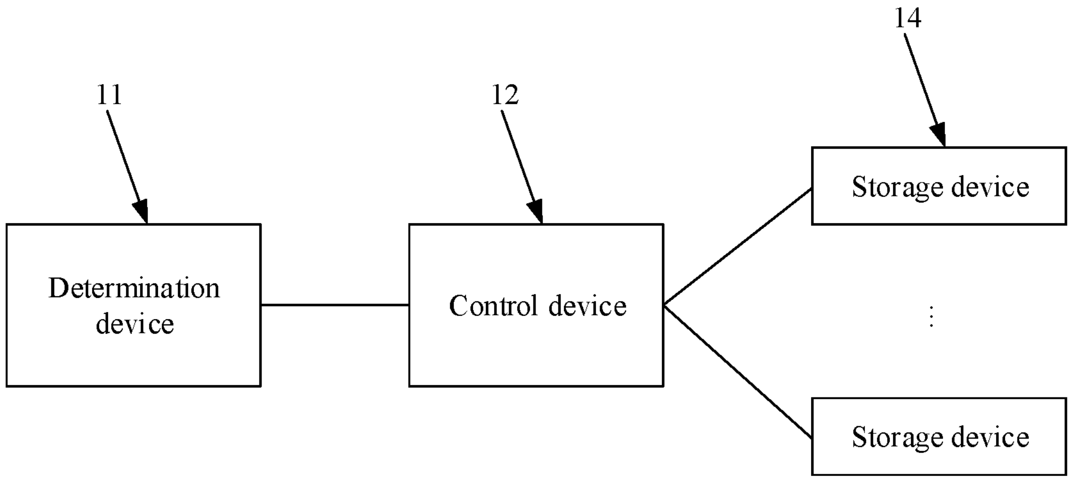
FIG. 13 is a schematic structural diagram of a device for gamma correction according to still another embodiment of the present disclosure.

Referring to FIG. 13, FIG. 13 is a schematic structural diagram of a device for gamma correction according to still another embodiment of the present disclosure. On the basis of the method shown in FIG. 11, the device for gamma correction shown in FIG. 13 also includes multiple independent storage devices 14. The storage devices 14 correspond to the grayscale intervals respectively, and each storage device is configured to store gamma data of the corresponding grayscale interval. In an embodiment, the storage device 14 may be a storage (not shown in the figure), which is not limited in the present disclosure. When performing gamma correction, based on the gamma data stored in the storage device 14, the grayscale interval data signal is provided for the corresponding sub-frame. In addition, when the corresponding grayscale interval is stored as the target grayscale interval in the storage device 14, the calibration data is acquired.

The mode shown in FIG. 13 is provided with the storage device 14 on the basis of the mode shown in FIG. 11. Apparently, the storage device 14 may also be provided on the basis of the mode shown in FIG. 12.

In one embodiment, a refresh period includes four sub-frames, the four sub-frames are the first sub-frame to the fourth sub-frame in sequence, corresponding to the first grayscale interval to the fourth grayscale interval respectively. The first grayscale interval to the fourth grayscale interval may be divided based on four grayscale values of 0, a, b, c, and d as shown in FIG. 5, $0<a<b<c<d=255$. The first grayscale interval to the fourth grayscale interval correspond to the first storage device 141, the second storage device 142, the third storage device 143 and the fourth storage device 144 respectively. The timing of the first sub-frame to the fourth sub-frame is controlled based on the sub-frame control signal. At this time, the timings corresponding to the above first correction state, second correction state, third correction state, and fourth correction state are shown in FIG. 11-FIG. 17.

Referring to FIG. 14-FIG. 17, FIG. 14 to FIG. 17 are timing diagrams of a device for gamma correction according to an embodiment of the present disclosure. The first storage device 141, the second storage device 142, the third storage device 143 and the fourth storage device 144 are four independent storage devices 14, which are configured to store the gamma data of corresponding sub-frames and grayscale intervals, these four storage devices 14 do not affect each other. The durations of the first sub-frame to the fourth sub-frame may be the same or different. In the manners shown in FIG. 14 to FIG. 17, the durations of the first sub-frame to the fourth sub-frame increase sequentially as an example for illustration. A refresh period includes the first sub-frame→the second sub-frame→the third sub-frame→the fourth sub-frame in timing. When the gamma correction is performed, the display state cycles in the order of the first sub-frame→the second sub-frame→the third sub-frame→the fourth sub-frame for correction.

Figure 14:
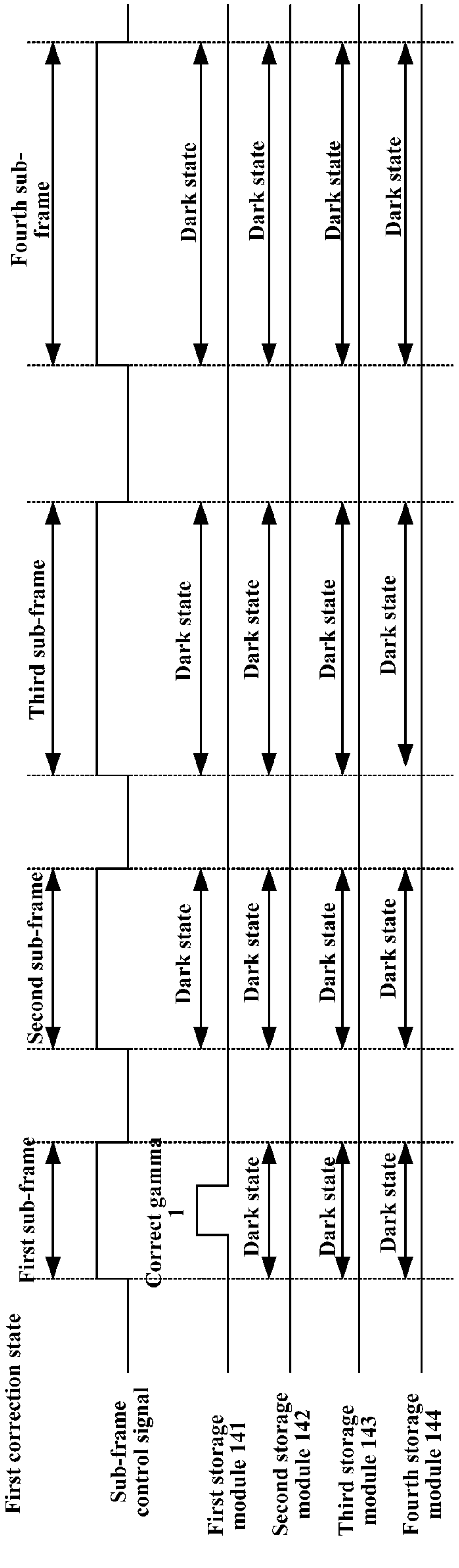
FIG. 14 to FIG. 17 are timing diagrams of a device for gamma correction according to an embodiment of the present disclosure.

As shown in FIG. 14, in the first correction state: the first sub-frame is the target sub-frame, and the first grayscale interval is grayscales ranged from 0 to a. In the second sub-frame to the fourth sub-frame, fixed dark state data signals are inputted based on the second storage device 142 to the fourth storage device 144 respectively. The corresponding grayscale optical data is collected and a required brightness is adjusted to acquire the corresponding calibration data signal.

Figure 15:
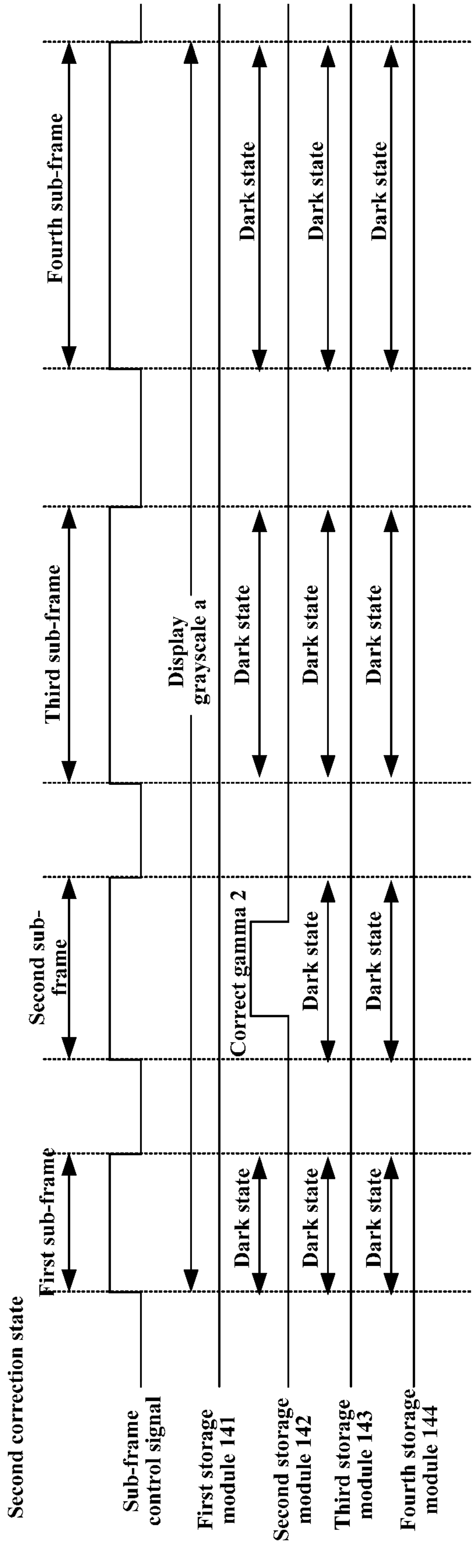

As shown in FIG. 15, in the second correction state: the second sub-frame is the target sub-frame, and the second grayscale interval is grayscales ranged from a to b. In the first sub-frame, based on the first data signal corresponding to the input of the first storage device 141, the first storage device 141 is fixedly set the data signal corresponding to the grayscale a as the first data signal, so the brightness data of the grayscale a is displayed in the first sub-frame. In the third sub-frame and the fourth sub-frame, a fixed dark state data signal is inputted based on the third storage device 143 and the fourth storage device 144 respectively. The corresponding grayscale optical data is collected and the required brightness is adjusted to acquire the corresponding calibration data signal.

Figure 16:
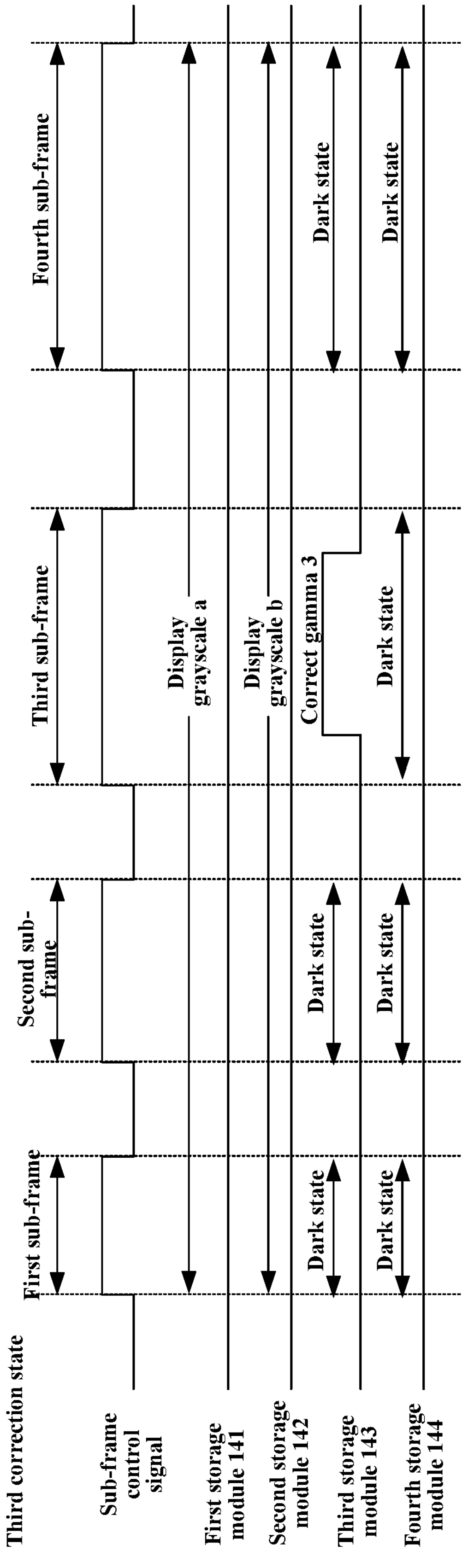

As shown in FIG. 16, in the third correction state: the third sub-frame is the target sub-frame, and the third grayscale interval is grayscales ranged from b to c. In the first sub-frame and the second sub-frame, the corresponding first data signals are inputted based on the first storage device 141 and the second storage device 142 respectively. The first storage device 141 is fixedly set the data signal corresponding to the grayscale a as the first data signal, the second storage device 142 is fixed to set the data signal corresponding to grayscale b as the first data signal, so the brightness data of grayscale a is displayed in the first sub-frame, and the brightness data of grayscale b is displayed in the second sub-frame. In the fourth sub-frame, a fixed dark state data signal is inputted based on the fourth storage device 144. The corresponding grayscale optical data is collected and the required brightness is adjusted to acquire the corresponding calibration data signal.

Figure 17:
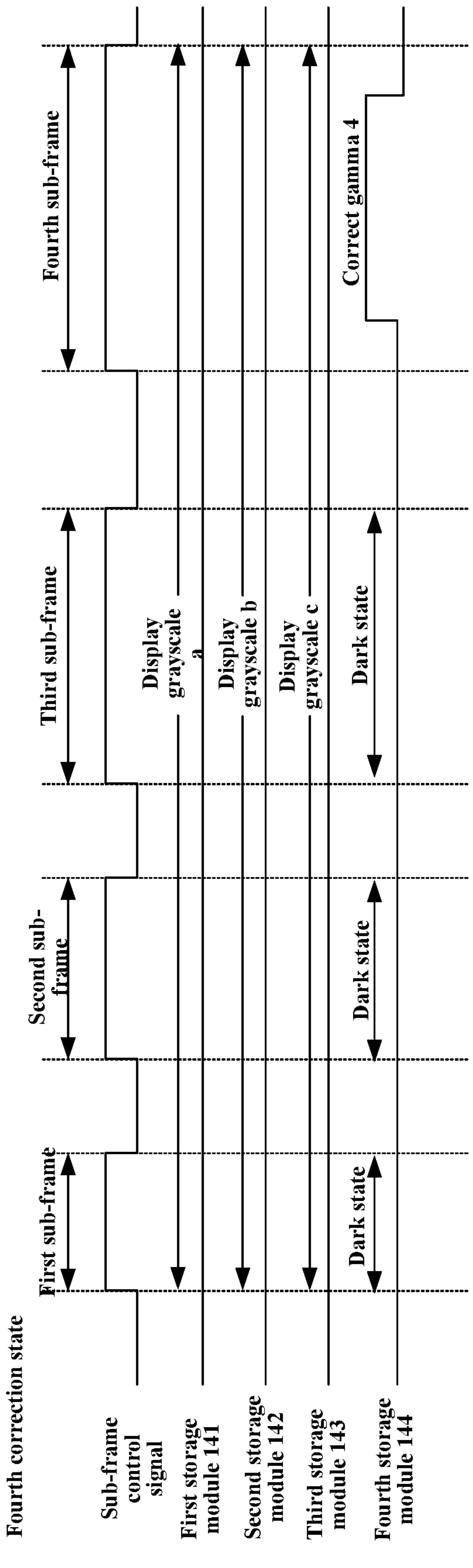

As shown in FIG. 17, in the fourth correction state: the fourth sub-frame is the target sub-frame, and the fourth grayscale interval is grayscales ranged from c to 255. From the first sub-frame to the third sub-frame, the corresponding first data signals are inputted based on the first storage device 141, the second storage device 142 and the third storage device 143 respectively. The first storage device 141 is fixedly set the data signal corresponding to the grayscale a as the first data signal. The second storage device 142 is fixedly set the data signal corresponding to the grayscale b as the first data signal. The third storage device 143 is fixedly set the data signal corresponding to the grayscale c as the first data signal. Hence, the brightness data of grayscale a is displayed in the first sub-frame, the brightness data of grayscale b is displayed in the second sub-frame, and the brightness data of grayscale c is displayed in the third sub-frame. The corresponding grayscale optical data is collected and the required brightness is adjusted to acquire the corresponding calibration data signal.

As shown in FIG. 14-FIG. 17, when adjusting the second sub-frame, the display grayscale of the first sub-frame may be selected from 0 to a according to the correction effect, In other words, it is not limited to displaying the brightness data of the grayscale a based on the corresponding first data signal as described in the above embodiment. In one embodiment, it may also display the preset grayscale between 0 to a based on the second data signal. Similarly, when adjusting the third sub-frame, according to the correction effect, the display grayscale of the first sub-frame may be selected between 0 and a, and the display grayscale of the second sub-frame may be selected between a and b, respectively. When adjusting the fourth sub-frame, according to the correction effect, the display grayscale of the first sub-frame may be selected between 0 and a, the display grayscale of the second sub-frame may be selected between a and b, and the display grayscale of the third sub-frame may be selected between b and c respectively.

In other ways, when the second sub-frame is adjusted, the display grayscale of the first sub-frame may not be fixed to display grayscale a or display the brightness data of a preset grayscale between 0 and a, but may change according to the correction effect. Similarly, when adjusting the third sub-frame, the brightness of the first sub-frame and the second sub-frame may not set to display a fixed brightness data, but may change according to the correction effect; when adjusting the fourth sub-frame, the first sub-frame to the third sub-frame may not be set to display a fixed brightness data, but may change according to the correction effect.

The device for gamma correction provided by the present disclosure can implement the method for gamma correction above. It can perform different display controls on the target sub-frame and sub-frames other than the target sub-frame when performing gamma correction on the display panel, which make the method for gamma correction more flexible.

Figure 18:
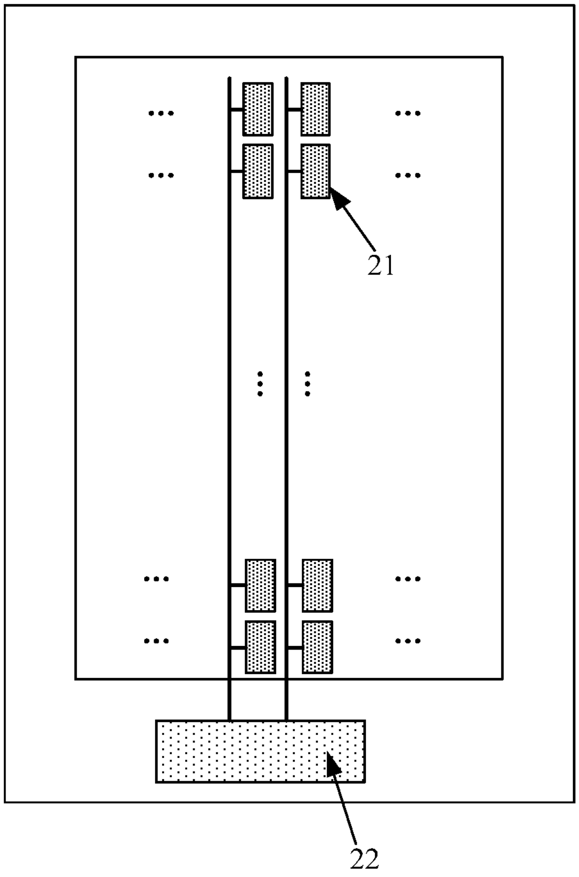
FIG. 18 is a schematic structural diagram of a display panel according to an embodiment of the present disclosure.

Based on the above embodiments, a display panel is further provided according to another embodiment of the present disclosure as shown in FIG. 18.

Referring to FIG. 18, FIG. 18 is a schematic structural diagram of a display panel according to an embodiment of the present disclosure. The display panel shown includes as follows.

A sub-pixel 21, where a refresh period of the sub-pixel 21 is divided into at least two sub-frames, different sub-frames correspond to different grayscale intervals, and the different grayscale intervals do not overlap with each other.

A controller 22, configured to determine a target grayscale interval where a to-be-displayed grayscale is located and a target sub-frame corresponding to the target grayscale interval based on the to-be-displayed grayscale, and provide a grayscale interval data signal to the sub-pixel 21 in each of sub-frames other than the target sub-frame, and provide a calibration data signal to the sub-pixel in the target sub-frame. Where, the calibration data signal may be determined based on the method for gamma correction/device for gamma correction in the above embodiments.

The controller 22 may be connected to the sub-pixel 21 through the pixel circuit, to control the sub-pixel 21 to perform light-emitting display through the pixel circuit. In one embodiment, the controller 22 may be an IC.

In the display panel provided by the embodiment of the present disclosure, one refresh period of the sub-pixel is divided into at least two sub-frames, and different sub-frames correspond to different grayscale intervals. When performing image display, based on the determined target grayscale, the target sub-frame and sub-frames other than the target sub-frame perform different display controls on the sub-pixels, to improve display quality.

As described above, in the embodiment of the present disclosure, the sub-pixel is a micro LED, and the micro LED may be a Mini LED or a Micro LED. The display panel can control the sub-pixel 21 to perform multiple sub-frames display, provide the sub-pixel 21 with a grayscale interval data signal in each of sub-frames other than the target sub-frame, and provide the sub-pixel 21 with the calibration data signal determined by the method for gamma correction/the device for gamma correction of the above embodiments in the target sub-frame, which can solve the problem of poor light-emitting display effect of the micro-LED at low grayscale.

Figure 19:
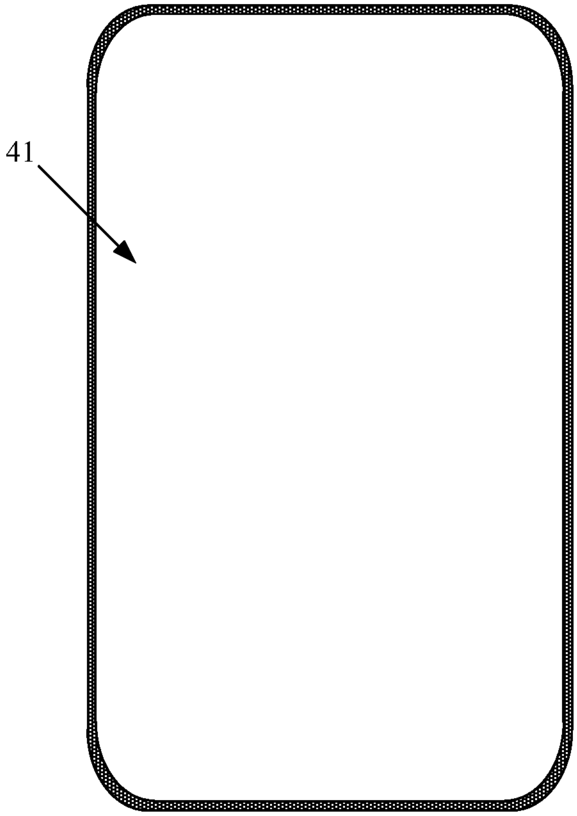
FIG. 19 is a schematic structural diagram of a display device according to an embodiment of the present disclosure.

Based on the above embodiments, a display device is further provided according to another embodiment of the present disclosure as shown in FIG. 19.

Referring to FIG. 19, FIG. 19 is a schematic structural diagram of a display device according to an embodiment of the present disclosure. The display device includes a display panel 41, which is the display panel 14 provided in the above embodiments. Where, the display device may be an electronic device such as a mobile phone, a tablet computer, a vehicle-mounted display device and a wearable device with a display function. The specific implementations and application fields of the display device are not limited in the embodiments of the present disclosure.

With the display panel provided by the above embodiments, the display device can control the sub-pixel 21 to perform multiple sub-frames display, and provide the sub-pixel 21 with a grayscale interval data signal in each of sub-frames other than the target sub-frame, while provide the sub-pixel 21 with the calibration data signal determined by the method for gamma correction/the device for gamma correction of the above embodiments in the target sub-frame, which can solve the problem of poor light-emitting display effect of the micro LED at low grayscales.

The display device provided by the embodiment of the present disclosure has the above display panel. When displaying an image, based on the determined target grayscale, different display controls are performed on the sub-pixel in the target sub-frame and sub-frames other than the target sub-frame, to improve the display quality.

Each embodiment in this specification is described in a progressive, parallel, or progressive and parallel manner. Each embodiment focuses on the differences from other embodiments. The same and similar parts between the various embodiments can be referred to each other. As for the device of the gamma correction, display panel and display device disclosed in the embodiments, since they correspond to the method disclosed in the embodiment, the descriptions are relatively simple. The relevant information may refer to the description of the relevant part of the method for gamma correction.

It should be noted that in the description of the present disclosure, the descriptions of the figures and embodiments are illustrative rather than restrictive. Similar reference numerals identify similar structures throughout the embodiments of the specification. In addition, the drawings may exaggerate the thickness of some layers, films, panels, regions and the like for the sake of understanding and ease of description. In addition, it should be understood that when an element such as a layer, film, region, or substrate is referred to as being "on" another element, it can be directly on the other element or intervening elements may be existed. In addition, "on" means positioning an element on or under another element, which does not essentially mean positioning on an upper side of another element according to the direction of gravity.

The orientation or positional relationship indicated by the terms "upper", "lower", "top", "bottom", "inner", "outer", and the like are based on the orientation or positional relationship shown in the drawings, which are only for the convenience of describing the present disclosure and simplified descriptions, rather than indicating or implying that the apparatus or element referred to must have a specific orientation, be constructed and operate in a specific orientation, which should not be construed as limiting the present disclosure. When a component is considered to be "connected" to another component, it may be directly connected to another component or there may also be an intervening component.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, an article or a device including a series of elements include not only the disclosed elements but also other elements that are not clearly enumerated, or further include inherent elements of the article or the device. Unless expressively limited, the statement "including a . . . " does not exclude the case that other similar elements may exist in the article or the device other than enumerated elements.

What is claimed is:

1. A method for gamma correction of a display panel, wherein the display panel comprising:

a sub-pixel, wherein a refresh period of the sub-pixel is divided into at least two sub-frames, different sub-frames correspond to different grayscale intervals, a grayscale interval comprises a plurality of grayscale values, and the different grayscale intervals do not overlap with each other;

wherein at least one interval width of a low grayscale interval and a high grayscale interval is smaller than an interval width of a grayscale interval other than the low grayscale interval and the high grayscale interval in the grayscale intervals;

wherein the method for gamma correction comprises:

based on a to-be-displayed grayscale, determining a target grayscale interval where the to-be-displayed grayscale is located and a target sub-frame corresponding to the target grayscale interval; and correcting a gamma of the target grayscale interval, comprising:

in each of sub-frames before the target sub-frame, providing a grayscale interval data signal corresponding to a grayscale from a corresponding grayscale interval to the sub-pixel, wherein the grayscale interval data signal comprises at least one of a first data signal and a second data signal, the first data signal is a data signal corresponding to a larger endpoint-grayscale between two endpoint-grayscales of the corresponding grayscale interval, and the second data signal is a data signal corresponding to a preset grayscale between the two endpoint-grayscales of the corresponding grayscale interval;

in the target sub-frame, providing a data signal corresponding to the to-be-displayed grayscale to the sub-pixel, and correcting based on collected optical data to obtain a calibration data signal; and in each of sub-frames after the target sub-frame, providing a dark state data signal to the sub-pixel.

2. The method according to claim 1, wherein dividing the refresh period of the sub-pixel into at least two sub-frames comprises:

dividing grayscales ranged from 0 to 255 into a first grayscale interval to a n-th grayscale interval; wherein a grayscale range of a i-th grayscale interval is from $GS_{i-1}$ to $GS_i$, where n is a positive integer, and i is a positive integer and no greater than n, $GS_i$ is a positive number in the grayscales ranged from 0 to 255, $GS_{i-1}$ is less than $GS_i$, $GS_0=0$, $GS_n=255$; and wherein, the refresh period comprises a first sub-frame to an i-th sub-frame, a timing of a (i−1)-th sub-frame is before a timing of a i-th sub-frame, and the i-th sub-frame corresponds to the i-th grayscale interval.

3. The method according to claim 2, wherein in a case that the to-be-displayed grayscale is in a j-th grayscale interval, where j is a positive integer and no greater than n, the providing the grayscale interval data signal corresponding to the grayscale from the corresponding grayscale interval to the sub-pixel in each of the sub-frames before the target sub-frame; the providing the data signal corresponding to the to-be-displayed grayscale to the sub-pixel in the target sub-frame, and the correcting based on the collected optical data to obtain the calibration data signal; and the providing the dark state data signal to the sub-pixel in each of the sub-frames after the target sub-frame comprises:

in a case that j=1, in the first sub-frame, correcting the sub-pixel to obtain the calibration data signal, and in each of a second sub-frame to the n-th sub-frame, providing the dark state data signal to the sub-pixel;

in a case that 1<j<n, in a p-th sub-frame, by using a first data signal corresponding to the p-th sub-frame, controlling the sub-pixel to emit light; in a j-th sub-frame, correcting the sub-pixel to obtain the calibration data signal corresponding to the sub-pixel in the j-th sub-frame; and in each of sub-frames after the j-th sub-frame, providing the dark state data signal to the sub-pixel; and in a case that j=n, in the p-th sub-frame, by using the first data signal corresponding to the p-th sub-frame, controlling the sub-pixel to emit light; and in the n-th sub-frame, correcting the sub-pixel to obtain the calibration data signal corresponding to the sub-pixel in the n-th sub-frame;

wherein p is a positive integer and less than j.

4. The method according to claim 2, wherein in a case that the to-be-displayed grayscale is in a j-th grayscale interval, wherein j is a positive integer and no greater than n, the providing the grayscale interval data signal corresponding to the grayscale from the corresponding grayscale interval to the sub-pixel in each of the sub-frames before the target sub-frame; the providing the data signal corresponding to the to-be-displayed grayscale to the sub-pixel in the target sub-frame, and the correcting based on the collected optical data to obtain the calibration data signal; and the providing the dark state data signal to the sub-pixel in each of the sub-frames after the target sub-frame comprises:

in a case that j=1 in the first sub-frame, correcting the sub-pixel to obtain the calibration data signal corresponding to the sub-pixel in the first sub-frame, and in each of a second sub-frame to the n-th sub-frame, providing the dark state data signal to the sub-pixel;

in a case that 1<j<n, in at least one sub-frame from the first sub-frame to a (j−1)-th sub-frame, by using the second data signal, controlling the sub-pixel to emit light; in a j-th sub-frame, correcting the sub-pixel to obtain the calibration data signal corresponding to the sub-pixel in the j-th sub-frame; and in each of the sub-frames after the j-th sub-frame, providing the dark state data signal to the sub-pixel; and in a case that j=n, in the at least one sub-frame from the first sub-frame to the (j−1)-th sub-frame, by using the second data signal, controlling the sub-pixel to emit light; and in the n-th sub-frame, correcting the sub-pixel to obtain the calibration data signal corresponding to the sub-pixel in the n-th sub-frame.

5. The method according to claim 1, wherein a value of the preset grayscale ranges from 0.8M to M, wherein M is a positive integer and no greater than 255, and M is the larger endpoint-grayscale between the two endpoint-grayscales of the grayscale interval corresponding to the second data signal.

6. The method according to claim 1, wherein the providing the first data signal, or the second data signal to the sub-pixel in the at least one sub-frame before the target sub-frame comprises:

in sub-frames before the target sub-frame, providing the first data signal to the sub-pixel in at least one of the sub-frames before the target sub-frame.

7. The method according to claim 6, wherein in each of the sub-frames before the target sub-frame, providing the first data signal to the sub-pixel.

8. The method according to claim 1, wherein the providing the first data signal, or the second data signal to the sub-pixel in the at least one sub-frame before the target sub-frame comprises:

in sub-frames before the target sub-frame, providing the second data signal to the sub-pixel in at least one of the sub-frames before the target sub-frame.

9. The method according to claim 1, wherein in a same refresh period, a duration of each sub-frame increases sequentially in timing.

10. The method according to claim 1, wherein the refresh period of the sub-pixel is equally divided into at least two sub-frames.

11. The method according to claim 1, further comprising:

dividing grayscales ranged from 0 to 255 equally into at least two grayscale intervals.

12. The method according to claim 1, further comprising:

dividing grayscales ranged from 0 to 255 into a first grayscale interval to a n-th grayscale interval; wherein a grayscale range of a i-th grayscale interval is from $GS_{i-1}$ to $GS_i$, where n is a positive integer, and i is a positive integer and no greater than n, $GS_i$ is a positive number in the grayscales ranged from 0 to 255, $GS_{i-1}$ is less than $GS_i$, $GS_0=0$, $GS_n=255$; wherein an interval midpoint of a p-th grayscale interval is at a first difference from $GS_n/2$, an interval midpoint of a q-th grayscale interval is at a second difference from $GS_n/2$, wherein p≠q, and both p and q are positive integers and no greater than n; an absolute value of the first difference is greater than an absolute value of the second difference, and a difference between two endpoint-grayscales of the p-th grayscale interval is less than a difference between two endpoint-grayscales of the q-th grayscale interval.

13. The method according to claim 1, further comprising:

based on an acquired instruction, dividing the refresh period of the sub-pixel into at least two sub-frames.

14. A device for gamma correction of a display panel, the display panel comprising:

a sub-pixel, wherein a refresh period of the sub-pixel is divided into at least two sub-frames, different sub-frames correspond to different grayscale intervals, a grayscale interval comprises a plurality of grayscale values, the different grayscale intervals do not overlap with each other, and at least one interval width of a low grayscale interval and a high grayscale interval is smaller than an interval width of a grayscale interval other than the low grayscale interval and the high grayscale interval in the grayscale intervals; and a controller, configured to:

determine a target grayscale interval where a to-be-displayed grayscale is located and a target sub-frame corresponding to the target grayscale interval based on the to-be-displayed grayscale; and correct a gamma of the target grayscale interval, comprising:

in each of sub-frames before the target sub-frame, provide a grayscale interval data signal corresponding to a grayscale from a corresponding grayscale interval to the sub-pixel, wherein the grayscale interval data signal comprises at least one of a first data signal and a second data signal, the first data signal is a data signal corresponding to a larger endpoint-grayscale between two endpoint-grayscales of the corresponding grayscale interval, and the second data signal is a data signal corresponding to a preset grayscale between the two endpoint-grayscales of the corresponding grayscale interval;

in the target sub-frame, provide a data signal corresponding to the to-be-displayed grayscale to the sub-pixel, and correct based on collected optical data to obtain a calibration data signal; and in each of sub-frames after the target sub-frame, provide a dark state data signal to the sub-pixel.

15. The device according to claim 14, the controller is further configured to: divide the refresh period of the sub-pixel into at least two sub-frames based on an acquired instruction.

16. The device according to claim 14, further comprising:

a plurality of independent storages, wherein each storage corresponds to a respective grayscale interval, and each storage is configured to store gamma data of the respective grayscale interval.

17. A display panel, comprising:

a sub-pixel, wherein a refresh period of the sub-pixel is divided into at least two sub-frames, different sub-frames correspond to different grayscale intervals, a grayscale interval comprises a plurality of grayscale values, the different grayscale intervals do not overlap with each other, and at least one interval width of a low grayscale interval and a high grayscale interval is smaller than an interval width of a grayscale interval other than the low grayscale interval and the high grayscale interval in the grayscale intervals; and a controller, configured to:

determine a target grayscale interval where a to-be-displayed grayscale is located and a target sub-frame corresponding to the target grayscale interval based on the to-be-displayed grayscale; and correct a gamma of the target grayscale interval, comprising:

provide a grayscale interval data signal corresponding to a grayscale from a corresponding grayscale interval to the sub-pixel in each of sub-frames before the target sub-frame, wherein the grayscale interval data signal comprises at least one of a first data signal and a second data signal, the first data signal is a data signal corresponding to a larger endpoint-grayscale between two endpoint-grayscales of the corresponding grayscale interval, and the second data signal is a data signal corresponding to a preset grayscale between the two endpoint-grayscales of the corresponding grayscale interval;

provide a data signal corresponding to the to-be-displayed grayscale to the sub-pixel in the target sub-frame, and correct based on collected optical data to obtain a calibration data signal; and in each of sub-frames after the target sub-frame, provide a dark state data signal to the sub-pixel.

18. The display panel according to claim 17, wherein the sub-pixel is a micro LED.

19. A display device, comprising the display panel according to claim 17.

* * * * *